(12) United States Patent
Breindel et al.

(10) Patent No.: US 10,184,037 B2
(45) Date of Patent: *Jan. 22, 2019

(54) THERMOPLASTIC FOAMS AND METHOD OF FORMING THEM USING NANO-GRAPHITE

(71) Applicant: Owens Corning Intellectual Capital, LLC, Toledo, OH (US)

(72) Inventors: Raymond Breindel, Hartville, OH (US); Roland Loh, Coppell, TX (US); Joseph P. Rynd, Stow, OH (US); Yadolah Delaviz, Lewis Center, OH (US); Mark E. Polasky, Mogadore, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 87 days.

This patent is subject to a terminal disclaimer.

(21) Appl. No.: 15/147,159

(22) Filed: May 5, 2016

(65) Prior Publication Data

US 2016/0319093 A1 Nov. 3, 2016

Related U.S. Application Data

(60) Division of application No. 12/769,144, filed on Apr. 28, 2010, now Pat. No. 9,359,481, which is a
(Continued)

(51) Int. Cl.
*B82Y 30/00* (2011.01)
*C08J 5/00* (2006.01)
(Continued)

(52) U.S. Cl.
CPC .............. *C08J 9/008* (2013.01); *B82Y 30/00* (2013.01); *C08J 5/005* (2013.01); *C08J 9/0061* (2013.01);
(Continued)

(58) Field of Classification Search
CPC ........ C08J 9/008; C08J 2325/06; C08J 9/144; C08J 9/122; C08J 9/02
See application file for complete search history.

(56) References Cited

U.S. PATENT DOCUMENTS 2,365,086 A 12/1944 Kamowski
3,574,644 A 4/1971 Olstowski et al.
(Continued)

FOREIGN PATENT DOCUMENTS

DE 19907663 8/2000
DE 19910257 9/2000
(Continued)

OTHER PUBLICATIONS

International Search Report from PCT/US04/39336 dated Apr. 7, 2005.
(Continued)

*Primary Examiner* — Hai Vo
(74) *Attorney, Agent, or Firm* — Calfee, Halter & Griswold LLP

(57) ABSTRACT

Rigid foam insulating products and processes for making such insulation products are disclosed. The foam products are formed from a polymer, a blowing agent, and nano-graphite. The nano-graphite has a size in at least one dimension less than about 100 nm and, in exemplary embodiments may be an intercalated, expanded nano-graphite. In addition, the nano-graphite may include a plurality of nanosheets having a thickness between about 10 to about 100 nanometers. The nano-graphite acts as a process additive to improve the physical properties of the foam product, such as thermal insulation and compressive strength. In addition, the nano-graphite in the foam controls cell morphology and acts as a nucleating agent in the foaming process. Further, the nano-graphite exhibits overall compound effects on foam properties including improved insu-
(Continued)

Exemplary Extruded Polystyrene Foam with 5% nano-MMT and 6% $CO_2$ lating value (increased R-value) for a given thickness and density and improved ultraviolet (UV) stability.

10 Claims, 8 Drawing Sheets

Related U.S. Application Data continuation-in-part of application No. 10/722,929, filed on Nov. 26, 2003, now Pat. No. 8,568,632, and a continuation-in-part of application No. 11/481,130, filed on Jul. 5, 2006, which is a continuation-in-part of application No. 11/026,011, filed on Dec. 31, 2004, now Pat. No. 7,605,188.

(51) Int. Cl.
*C08J 9/00* (2006.01)
*C08J 9/02* (2006.01)
*C08J 9/12* (2006.01)
*C08J 9/14* (2006.01)
*F16L 59/02* (2006.01)

(52) U.S. Cl.
CPC ............... *C08J 9/0066* (2013.01); *C08J 9/02* (2013.01); *C08J 9/122* (2013.01); *C08J 9/144* (2013.01); *F16L 59/028* (2013.01); *C08J 2201/03* (2013.01); *C08J 2205/052* (2013.01); *C08J 2205/10* (2013.01); *C08J 2325/04* (2013.01); *C08J 2325/06* (2013.01); *C08J 2433/00* (2013.01); *Y10T 428/249977* (2015.04); *Y10T 428/249978* (2015.04); *Y10T 428/249979* (2015.04); *Y10T 428/249986* (2015.04)

(56) References Cited

U.S. PATENT DOCUMENTS

| | | |
|---|---|---|
| 3,627,480 A | 12/1971 | Birchall |
| 3,673,290 A | 6/1972 | Brubaker et al. |
| 4,229,396 A | 10/1980 | Suh et al. |
| 4,301,040 A | 11/1981 | Berbeco |
| 4,385,156 A | 5/1983 | Ingram et al. |
| 4,394,460 A | 7/1983 | Chung et al. |
| 4,692,381 A | 9/1987 | Pecsok |
| 4,857,390 A | 8/1989 | Allen et al. |
| 4,996,109 A | 2/1991 | Krieg et al. |
| 5,010,112 A | 4/1991 | Glicksman et al. |
| 5,082,608 A | 1/1992 | Karabedian et al. |
| 5,130,342 A | 7/1992 | McAllister et al. |
| 5,147,896 A | 9/1992 | York |
| 5,186,919 A | 2/1993 | Bunnell |
| 5,234,967 A | 8/1993 | Takezawa et al. |
| 5,240,968 A | 8/1993 | Paquet et al. |
| 5,366,675 A | 11/1994 | Needham |
| 5,369,135 A | 11/1994 | Campbell et al. |
| 5,489,407 A | 2/1996 | Suh et al. |
| 5,550,170 A | 8/1996 | Trager et al. |
| 5,674,916 A | 10/1997 | Shmidt et al. |
| 5,679,718 A | 10/1997 | Suh et al. |
| 5,710,186 A | 1/1998 | Chaudhary |
| 5,719,199 A | 2/1998 | Wallace et al. |
| 5,753,161 A | 5/1998 | Lightle et al. |
| 5,776,389 A * | 7/1998 | Chaudhary ............ C08J 9/0023 264/50 |
| 5,779,775 A | 7/1998 | Kuwabara |
| 5,853,752 A | 12/1998 | Unger et al. |
| 5,854,295 A | 12/1998 | Suh et al. |
| 5,869,544 A | 2/1999 | Shmidt et al. |
| 5,912,279 A | 6/1999 | Hammel et al. |
| 5,977,197 A | 11/1999 | Malone |
| 5,993,707 A | 11/1999 | Chaudhary et al. |
| 5,997,781 A | 12/1999 | Nishikawa et al. |
| 6,048,909 A | 4/2000 | Chaudhary et al. |
| 6,071,580 A * | 6/2000 | Bland ................ A61L 15/425 428/36.5 |
| 6,093,752 A | 7/2000 | Park et al. |
| 6,123,881 A | 9/2000 | Miller et al. |
| 6,130,265 A | 10/2000 | Glueck et al. |
| 6,133,333 A | 10/2000 | Chaudhary et al. |
| 6,174,471 B1 | 1/2001 | Park et al. |
| 6,197,233 B1 | 3/2001 | Mason et al. |
| 6,213,540 B1 | 4/2001 | Tusim et al. |
| 6,231,795 B1 | 5/2001 | Chaudhary et al. |
| 6,242,540 B1 | 6/2001 | Crevecoeur et al. |
| 6,258,864 B1 | 7/2001 | Dalton et al. |
| 6,340,713 B1 | 1/2002 | Gluck et al. |
| 6,350,789 B1 | 2/2002 | Miller et al. |
| 6,355,341 B1 | 3/2002 | Chaudhary et al. |
| 6,358,599 B1 | 3/2002 | Deibel et al. |
| 6,362,242 B1 | 3/2002 | Gluck et al. |
| 6,384,094 B1 | 5/2002 | Glueck |
| 6,384,095 B1 | 5/2002 | Corr et al. |
| 6,387,968 B1 | 5/2002 | Gluck et al. |
| 6,395,795 B1 | 5/2002 | Hrivnak |
| 6,417,240 B1 | 7/2002 | Park |
| 6,420,442 B1 | 7/2002 | Dietzen et al. |
| 6,512,672 B1 | 1/2003 | Gluck |
| 6,518,324 B1 | 2/2003 | Kresta et al. |
| 6,589,646 B1 | 7/2003 | Morgenstern |
| 6,617,295 B2 | 9/2003 | Nitzsdhe |
| 6,696,504 B1 | 2/2004 | Havashi et al. |
| 6,699,454 B1 | 3/2004 | Moy et al. |
| 6,759,446 B2 | 7/2004 | Lee et al. |
| 6,815,491 B2 | 11/2004 | Adedeji et al. |
| 6,816,163 B2 | 11/2004 | Fiblger et al. |
| 6,844,055 B1 | 1/2005 | Grinshpun et al. |
| 6,864,298 B2 | 3/2005 | Maletzko et al. |
| 6,908,950 B2 | 6/2005 | Loh et al. |
| 7,071,258 B1 | 7/2006 | Jang et al. |
| 7,160,929 B1 | 1/2007 | Tan |
| 7,605,188 B2 | 10/2009 | Loh |
| 9,359,481 B2 | 6/2016 | Breindel et al. |
| 2001/0036970 A1 | 11/2001 | Park |
| 2002/0006976 A1 | 1/2002 | Subramonian et al. |
| 2002/0022672 A1 | 2/2002 | Thunhorst et al. |
| 2002/0041955 A1 | 4/2002 | Watanabe |
| 2002/0086908 A1 | 7/2002 | Chou et al. |
| 2002/0096797 A1 | 7/2002 | Stoffelsma et al. |
| 2002/0121717 A1 | 9/2002 | Chaudhary et al. |
| 2002/0155270 A1 | 10/2002 | Chaudhary et al. |
| 2002/0168509 A1 | 11/2002 | DeSimone et al. |
| 2003/0082343 A1 | 5/2003 | Brucker |
| 2003/0162852 A1 | 8/2003 | Chaudhary et al. |
| 2003/0175497 A1 | 9/2003 | Kobe et al. |
| 2003/0205832 A1 | 11/2003 | Lee et al. |
| 2004/0127621 A1 | 7/2004 | Drzal et al. |
| 2004/0167240 A1 | 8/2004 | Burgun et al. |
| 2004/0209782 A1 | 10/2004 | Zhang et al. |
| 2004/0234443 A1 | 11/2004 | Chen et al. |
| 2005/0027040 A1 | 2/2005 | Nelson et al. |
| 2005/0048276 A1 | 3/2005 | Wilson |
| 2005/0112356 A1 | 5/2005 | Rynd et al. |
| 2005/0192368 A1* | 9/2005 | Miller ................. B29C 44/3403 521/76 |
| 2006/0014908 A1 | 1/2006 | Rotermund et al. |
| 2006/0148916 A1 | 7/2006 | Loh et al. |
| 2008/0287560 A1 | 11/2008 | Loh |

FOREIGN PATENT DOCUMENTS

| | | |
|---|---|---|
| DE | 10229983 | 1/2004 |
| DE | 10-2004-019708 | 11/2005 |
| EP | 353701 | 2/1990 |
| EP | 515125 | 11/1992 |
| EP | 620246 | 10/1994 |
| EP | 729999 | 4/1996 |
| EP | 863175 | 9/1998 |
| EP | 921148 | 6/1999 |
| EP | 1024163 | 8/2000 |
| EP | 675918 | 9/2000 |

(56) References Cited

FOREIGN PATENT DOCUMENTS

| | | |
|---|---|---|
| EP | 1205437 | 5/2002 |
| EP | 1209189 | 5/2002 |
| EP | 922554 | 6/2003 |
| EP | 1214372 | 12/2005 |
| JP | 63-183941 | 7/1988 |
| JP | 11-504359 | 4/1999 |
| JP | 2002-212330 | 7/2002 |
| JP | 2002-521543 | 7/2002 |
| JP | 2003-292664 | 10/2003 |
| JP | 2004-196907 | 7/2004 |
| JP | 2005-002268 | 1/2005 |
| JP | 2007-512425 | 5/2007 |
| KR | 2001-0071028 | 7/2001 |
| WO | 97/31053 | 8/1997 |
| WO | 98/03581 | 1/1998 |
| WO | 98/51734 | 11/1998 |
| WO | 99/31170 | 6/1999 |
| WO | 99/47592 | 9/1999 |
| WO | 00/06635 | 2/2000 |
| WO | 00/34363 | 6/2000 |
| WO | 00/34365 | 6/2000 |
| WO | 01/39954 | 6/2001 |
| WO | 01/40362 | 6/2001 |
| WO | 03/055804 | 7/2003 |
| WO | 2004/003063 | 1/2004 |
| WO | 04/067577 | 8/2004 |
| WO | 2004/065461 | 8/2004 |
| WO | 04/078785 | 9/2004 |
| WO | 05/054349 | 6/2005 |
| WO | 06/009945 | 1/2006 |
| WO | 06/009980 | 1/2006 |
| WO | 06/073712 | 7/2006 |
| WO | 08/005022 | 1/2008 |

OTHER PUBLICATIONS

International Search Report from PCT/US05/45291 dated May 12, 2006.
International Search Report from PCT/US06/035056 dated Feb. 20, 2008.
International Search Report from PCT/US06/26490 dated Aug. 16, 2007.
International Search Report from PCT/US08/58643 dated Jul. 23, 2008.
Office action from U.S. Appl. No. 11/481,130 dated Dec. 3, 2009.
Notice of Abandonment from U.S. Appl. No. 11/481,130 dated Jul. 12, 2010.
Office action from U.S. Appl. No. 11/026,011 dated May 17, 2007.
Office action from U.S. Appl. No. 11/026,011 dated Jul. 31, 2008.
Office action from U.S. Appl. No. 11/026,011 dated Feb. 4, 2009.
Office action from U.S. Appl. No. 11/026,011 dated May 8, 2009.
Notice of Allowance from U.S. Appl. No. 11/026,011 dated Aug. 3, 2009.
Office action from U.S. Appl. No. 10/722,929 dated Jul. 25, 2005.
Office action from U.S. Appl. No. 10/722,929 dated Jan. 25, 2006.
Office action from U.S. Appl. No. 10/722,929 dated Jun. 8, 2006.
Office action from U.S. Appl. No. 10/722,929 dated Nov. 30, 2006.
Advisory action from U.S. Appl. No. 10/722,929 dated Mar. 16, 2007.
Office action from U.S. Appl. No. 10/722,929 dated Jul. 3, 2007.
Office action from U.S. Appl. No. 10/722,929 dated Dec. 26, 2007.
Office action from U.S. Appl. No. 10/722,929 dated Mar. 26, 2008.
Office action from U.S. Appl. No. 10/722,929 dated Nov. 20, 2008.
Advisory action from U.S. Appl. No. 10/722,929 dated Jan. 29, 2009.
Panel Decision from U.S. Appl. No. 10/722,929 dated Mar. 12, 2009.
Panel Decision from U.S. Appl. No. 10/722,929 dated Mar. 27, 2009.
Examiner's Answer from U.S. Appl. No. 10/722,929 dated Aug. 4, 2009.
Advisory action from U.S. Appl. No. 10/722,929 dated Nov. 19, 2009.
Notice of Allowance from U.S. Appl. No. 10/722,929 dated Jan. 6, 2010.
Office action from U.S. Appl. No. 10/722,929 dated May 17, 2010.
Office action from U.S. Appl. No. 10/722,929 dated Nov. 4, 2010.
Advisory Action from U.S. Appl. No. 10/722,939 dated Mar. 18, 2011.
Office action from U.S. Appl. No. 10/722,929 dated May 24, 2011.
Advisory Action from U.S. Appl. No. 10/722,929 dated Aug. 2, 2011.
Office action from U.S. Appl. No. 10/722,929 dated Aug. 26, 2011.
Communication from European Application No. 04811960.6 dated Jun. 15, 2011.
Communication from European Application No. 06800020.7 dated May 17, 2010.
Cassegneau, et al, Preparation and Characterization of Ultrathin Films Layer-by-Layer Self Assemgbgled from Graphite Oxide Nanoplatelets and Polymer, Langmuir, 2000, 16, 7318-24.
Chen et al., "Preparation of polymer/graphite conducting nanocomposite by intercalation polymerization", J of Applied Polymer Science, 82, 2506-2513 (2001).
Chen et al., "Dispersion of Graphite Nanosheets in a Polymer Matrix and the Conducting Property of the Nanocomposites", Polymer Engineering and Science, Dec. 2001, vol. 41, No. 12, pp. 2148-2154.
Drzal et al., "Graphite nanoplatelets as reinforcements for polymers", Polymers Preprints (American Chemical Society, Division of Polymer Chemistry), 42 (2), 42-43 (2001).
Han et al., "Extrusion of Polystyrene Foams Reinforced with Nano-Clays", 2003 ANTEC Conference, pp. 1635-1639.
Modesti et al., "Expandable graphite as an intumescent flame retardant in polyisocyanurate-polyurethane forms", Polymer Degradation and Stability, 77, 195-202 (2002).
Pan et al., "A new process of fabricating electrically conducting nylon 6/graphite nanocomposites via intercalation polymerization", J. of Polymer Science, Part B, Polymer Physics, 38, pp. 1626-1633 (2000).
Uhl et al, "Polystyrene/graphite nanocomposites: effect on thermal stability", Polymer Degradation and Stability, 76, 111-122 (2002).
Xiao et al., "Preparation of exfoliated graphite/polystyrene compsite by polymerizatiojn-filling technique", Polymer, 42, 4813-4816 (2001).
Zeng et al. "Polymer/Clay Nanocomposite Foams Prepared by CO2", 2003 ANTEC Conference, pp. 1732-1736.
Zhang et al. "Preparation and Combusion Properties of Flame Retardant SBA Cop9olymer/Graphite Oxide Nanocomposites", Marcromol, Mater Eng., Mar. 2004, 289, 355-59.
Office action from Chinese Application No. 200580046678.2 dated Jul. 6, 2011.
Office action from Chinese Application No. 200580046678.2 dated Apr. 6, 2011.
Office action from Chinese Application No. 200580046678.2 dated Dec. 11, 2009.
Office action from U.S. Appl. No. 12/769,144 dated Feb. 14, 2012.
Office action from U.S. Appl. No. 12/769,144 dated Apr. 27, 2012.
Office action from U.S. Appl. No. 12/769,144 dated Jun. 29, 2012.
Office action from U.S. Appl. No. 12/769,144 dated Jan. 16, 2013.
Office action from U.S. Appl. No. 12/769,144 dated Jun. 7, 2013.
Office action from U.S. Appl. No. 12/769,144 dated Nov. 20, 2013.
Office action from U.S. Appl. No. 12/769,144 dated May 29, 2014.
Office action from U.S. Appl. No. 12/769,144 dated Aug. 20, 2014.
Office action from U.S. Appl. No. 12/769,144 dated Sep. 8, 2014.
Office action from U.S. Appl. No. 12/769,144 dated Jan. 26, 2015.
Office action from U.S. Appl. No. 12/769,144 dated Jul. 14, 2015.
Notice of allowance from U.S. Appl. No. 12/769,144 dated Feb. 5, 2016.
Office action from Canadian Application No. 2,545,007 dated Jun. 23, 2011.
Office action from Australian Application No. 2005323239 dated Sep. 5, 2011.
Office action from New Zealand Application No. 547,067 dated Nov. 3, 2008.

(56) References Cited

OTHER PUBLICATIONS

Office action from Korean Application No. 2006-7009466 dated May 6, 2011.
Office action from Indian Application No. 1139/KOLNP/2006 dated Nov. 28, 2008.
Office action from Indian Application No. 1139/KOLNP/2006 dated Nov. 26, 2009.
Office action from Chinese Application No. 200480035089.x dated Sep. 7, 2007.
Office action from Chinese Application No. 200480035089.x dated Aug. 15, 2008.
Office action from Chinese Application No. 200480035089.x dated Nov. 28, 2008.
Office action from Chinese Application No. 200480035089.x dated Jun. 5, 2009.
Office action from Japanese Application No. 2006-541658 dated Mar. 22, 2011.
Office action from Japanese Application No. 2007-549422 dated Sep. 11, 2011.
Office action from Mexican Application No. 07/07970 dated Jun. 14, 2010.
Office action from Mexican Application No. 06/05995 dated Oct. 19, 2009.
Office action from Mexican Application No. 06/05995 dated Feb. 4, 2010.
Office action from Australian Application No. 2004295331 dated Aug. 4, 2009.
Office action from Australian Application No. 2005323239 dated Jul. 26, 2010.
Office action from Japanese Application No. 2007-549422 dated Oct. 11, 2011.
Office action from Chinese Application No. 200580046678.2 dated Oct. 14, 2011.
Mantell, C.L. "Carbon and Graphite Handbook", (1968), Cover pages and Table of Contents, Interscience Publishers copyright John Wiley & Sons, Inc., printed U.S. 11 pgs.
Zabel et al. "Graphite Intercalation Compounds I: Structure and Dynamics" (1990), Cover Pages and Table of Contents, copyright Springer-Verlag Berlin Heidelberg, printed in Germany, 13 pgs.
Office action from U.S. Appl. No. 10/722,929 dated Apr. 6, 2012.
Office action from Canadian Application No. 2,545,007 dated Apr. 30, 2012.
Office action from U.S. Appl. No. 10/722,929 dated Oct. 22, 2012.
Office action from Canadian Application No. 2,545,007 dated Jan. 22, 2013.
Office action from U.S. Appl. No. 10/722,929 dated May 17, 2013.
Notice of Allowance from U.S. Appl. No. 10/722,929 dated Jul. 10, 2013.
Office action from Canadian Application No. 2,592,281 dated Jun. 27, 2012.
Office action from U.S. Appl. No. 10/722,929 dated Aug. 13, 2012.
Office action from Korean Application No. 2007-7017520 dated Jun. 22, 2012.

* cited by examiner

Exemplary Extruded Polystyrene Foam

Exemplary Extruded Polystyrene Foam

Exemplary Extruded Polystyrene Foam with 2.5% Nano-MMT

Exemplary Extruded Polystyrene Foam with Nano-Calcium Carbonate

Exemplary Extruded Polystyrene Foam with Nano-Expanded Graphite

Exemplary Extruded Polystyrene Foam with 5% nano-MMT and 6% $CO_2$

THERMOPLASTIC FOAMS AND METHOD OF FORMING THEM USING NANO-GRAPHITE

CROSS-REFERENCE TO RELATED APPLICATIONS

This application is a divisional application of U.S. patent application Ser. No. 12/769,144, filed on Apr. 28, 2010 entitled "Thermoplastic Foams and Method of forming Them Using Nano-Graphite", which claims the benefit of prior applications U.S. patent application Ser. No. 10/722,929 entitled "Method Of Forming Thermoplastic Foams Using Nano-Particles To Control Cell Morphology" filed on Nov. 26, 2003, (now U.S. Pat. No. 8,568,632, issued on Oct. 29, 2013), and U.S. patent application Ser. No. 11/481,130 entitled "Polymer Foams Containing Nano-Graphite" filed on Jul. 5, 2006, which is a continuation-in-part of U.S. patent application Ser. No. 11/026,011 entitled "Polymer Foams Containing Nano-Graphite" filed Dec. 31, 2014 (now U.S. Pat. No. 7,605,188), the entire contents of which are expressly incorporated herein.

TECHNICAL FIELD AND INDUSTRIAL APPLICABILITY OF THE INVENTION

The present invention relates generally to foam products, and more particularly, to rigid foamed polymeric boards containing nano-graphite. The nano-graphite is added to provide benefits as a process aid, an R-value enhancer, UV radiation stability enhancer, a dimensional stability enhancer, a mechanical strength enhancer, and as a fire retardant. The added nano-graphite also is added to reduce foam surface static, to function as internal lubricant in the foaming process, and to control the cell morphology. A wide range of cell morphologies may be obtained by utilizing nano-particles as nucleating agents. Such rigid foams are useful for forming rigid insulating foam boards suitable in many conventional thermal insulation applications.

BACKGROUND OF THE INVENTION

In the past, infrared attenuating agents (IAAs) such as carbon black powdered amorphous carbon, graphite, and titanium dioxide have been used as fillers in polymeric foam boards to minimize material thermal conductivity which, in turn, will maximize insulating capability (increase R-value) for a given thickness. R-value is defined as the commercial unit used to measure the effectiveness of thermal insulation. A thermal insulator is a material, manufactured in sheets, that resists conducting heat energy. Its thermal conductance is measured, in traditional units, in Btu's of energy conducted times inches of thickness per hour of time per square foot of area per Fahrenheit degree of temperature difference between the two sides of the material. The R value (per inch) of the insulator is defined to be 1 divided by the thermal conductance per inch. R is an abbreviation for the complex unit combination hr. ft$^2$.° F./Btu. In SI units, an R value of 1 equals 0.17611 square meter Kelvin per watt (m$^2$·K/W).

The heat transfer through an insulating material can occur through solid conductivity, gas conductivity, radiation, and convection. The total thermal resistance, R, (sometimes called R-value) is the measure of the resistance to heat transfer, and is determined as:

$R=t/k$, where, $t$=thickness.

Rigid foamed plastic boards are extensively used as thermal insulating materials for many applications. It is highly desirable to improve the thermal conductivity without increasing the density, and/or the thickness of foam product. Particularly, the architectural community desires a foam board having a thermal resistance value of R=10, with a thickness of less than 1.8", for cavity wall construction, to keep at least 1" of the cavity gap clean.

It is also desirable to improve the UV stability, particularly for such as exterior wall insulation finishing system (EIFS), and highway and railway underground applications where prolonged exposure of sun light of the surface of the polymer foam boards are usually occurred in job-sites.

The physical properties of rigid polymer foam boards, such as their compressive strength, thermal conductivity, dimensional stability, water absorption rate, depend in large part on the micro-structure of the material forming the boards, i.e., the cell morphology of the foam. However, it can be difficult to control polymer foaming to the degree necessary for consistent production of a desirable cell morphology that will tend to optimize the overall foam properties, or to improve a specific property, such as the thermal insulation value of the foam Prior art attempts to make foam micro-structures having desirable cell morphologies have included the use of nucleation agents such as powders formed from inorganic oxides, various organic materials and metals. Among these nucleation agents, the inorganic oxides, such as talc, titanium dioxide and kaolin, are the most commonly used. The size, shape, particle distribution and surface treatment of the nucleation agent(s) utilized in the process to form a foam will all tend to affect the nucleation efficiency and, consequently, the cell size morphology and distribution in the resulting foam.

Conventional methods for controlling the cell morphology, however, tend to be limited by difficulties in evenly distributing particles of the nucleation agent throughout the polymer and/or suppressing coagulation of the dispersed particles. Certain structural defects in the resulting foams are generally attributed, at least in part, to dimensional differences between the particles of the nucleating agents, which may be in the range of several microns, particularly in situations where there has been some degree of coagulation, and the desired cell microstructures, which may have a target cell wall thickness in the range of 0.2 to 6 microns, often one micron or less, for low density commercial insulation foams.

This size difference between the nucleation agent particles and the cell wall thickness may also result in relatively weak interactions between the nucleating agent and nano-scale polymer, thereby weakening the overall foam structure. Similarly, cell defects may also be attributed, at least in part, to the hydrophilic surface of most conventional inorganic nucleation agents that makes them difficult to disperse evenly in a polymer. These effects tend to result in processing difficulties, such as corrugation of the resulting foam board, when nucleation agents are added at levels greater than about 2 weight percent or the median cell size of the resulting foam is less than around 120 microns.

Prior art attempts to avoid foam structure corrugation effects have utilized cell size enlarging agents such as the waxy compositions disclosed in U.S. Pat. No. 4,229,396, the contents of which are hereby incorporated by reference in their entirety, and the non-waxy compositions disclosed in U.S. Pat. No. 5,489,407, the contents of which are hereby incorporated by reference in their entirety.

Another effort directed toward foam structures having bi-modal cell morphology (Kanelite Super EIII, Kaneka, Japan) included use of immiscible blowing agents, such as water and hydrocarbon. This combination, however, tends to result in processing difficulties due to the low solubility of water in the polymer and the reaction of water with fire retardant, such as hexabromocyclododecane (HBCD) at the elevated temperatures typically utilized during the extrusion process.

Thus, there is a need for foam products, more specifically rigid foam boards, utilizing nano-graphite particles having at least one dimension—usually the thickness of the plate shaped graphite in nano-scale, i.e., less than 0.1 microns or 100 nanometers. It is a further object of the present invention to provide a process for preparing low density extruded polymer foams and foam boards containing nano-graphite which has good processing properties, and improved foam physical properties, including thermal conductivity, ultraviolet (UV) radiation resistance, dimensional stability, mechanical strength, flame spread rate and smoke density.

SUMMARY OF THE INVENTION

The present invention relates to foam insulating products and the processes for making such products, such as extruded polystyrene foam, that contains nano-graphite as a process additive to improve the physical properties such as thermal insulation and compressive strength. During foaming, nano-graphite acts as a nucleating agent and lubricant. Lubrication by the nano-graphite makes the flow of the melted polymer in the extruder easier, and provides a smooth surface to the foam board. Further, the nano-graphite reduces the amount of static present during the foaming process due to the increased electric conductivity of the skin of the nano-graphite polymer foam boards. Nano-graphite in a foam product also acts as a UV stabilizer and as a gas barrier in the final product.

The nano-particles (e.g., nano-graphite) are typically particles with at least one dimension less than 100 nm and may be incorporated into the polymer as surface modified nano-particles, nano-particles having mechanochemical bonds to a core micron sized particle, nano-particle compounds in combination with polymers, such as master batch compositions, and/or liquid blowing agents. Further, the nano-particle polymer compounds can be intercalated nano-layers, such as compounds formed simply by mixing nano-montmorillonite (MMT) or expanded graphite with a polymer, or exfoliated nano-layers, such as compounds formed by the in-situ polymerization of polymer precursors in the presence of nano-MMT or nanosheets or other surface-modified inorganic or graphite particles.

It is an object of the present invention to produce a rigid polymer foam containing nano-graphite which exhibits overall compound effects on foam properties including improved insulating value (increased R-value) for a given thickness and density, and ultraviolet (UV) stability.

It is another object of the present invention to produce a rigid polymer foam containing nano-graphite having retained or improved compressive strength, thermal dimensional stability and fire resistance properties.

It is yet another object of the present invention to provide nano-graphite in a rigid polymer foam which also acts as a process additive which control the cell morphology, reduces static and provides lubrication during the foaming process.

It is a further object of the present invention to lower the cost of a polymeric foam product in a simple and economical manner, such as by using nano-graphite as a low cost, functional colorant.

Additionally, the present invention provides a process for making a closed-cell, alkenyl aromatic polymer foam product in which nano-particle nucleation agents are utilized to control the cell morphology. The exemplary process includes: 1) heating an alkenyl aromatic polymer to the temperature above the glass transition temperature of the polymer (for amorphous polymer), or melt point of the polymer (for crystal polymer) to form a polymer melt; 2) incorporating an appropriate amount of selected nano-particles (e.g. nano-graphite) into the polymer melt to alter the polymer property and process behavior, such as rheology, melt strength; 3) incorporating blowing agents into the polymer melt at elevated pressure; 4) incorporating other additives, such as flame retardants into the polymer melt; and 5) extruding and forming a foam product, typically a rigid insulation board, under an atmospheric or sub-atmospheric pressure (partial vacuum) to produce a desired cell morphology, characterized by parameters such as cell size range and distribution, cell orientation and cell wall thickness.

One exemplary embodiment of the present invention provides a process for making a rigid polymer foam having a mean cell size ranging from several tens of microns to several hundred microns, preferably around 60 microns, by using surface modified hydrophobic nano-particles (e.g. nano-graphite). Conventional foams, in comparison, tend to have a median cell size of more than 150 microns produced by using conventional inorganic nucleating agents such as hydrophilic talc. The rigid foams prepared according to this exemplary embodiment of the invention exhibited no detectable corrugation and an improvement in compressive strength of around 30%.

A further exemplary embodiment of the present invention provides a process for forming an improved foam structure using a carbon dioxide blowing agent in combination with a nano-scale nucleating agent, such as nano-MMT, to produce a rigid foam having a reduced median cell size and thinner cell walls both to improve mechanical strength and decrease thermal conductivity (thereby increasing the insulation value) of the resulting foam.

The foregoing and other objects, features, and advantages of the invention will appear more fully hereinafter from a consideration of the detailed description that follows. It is to be expressly understood, however, that the drawings are for illustrative purposes and are not to be construed as defining the limits of the invention.

BRIEF DESCRIPTION OF THE DRAWINGS

The advantages of this invention will be apparent upon consideration of the following detailed disclosure of the invention, especially when taken in conjunction with the accompanying drawings wherein.

DETAILED DESCRIPTION AND PREFERRED EMBODIMENTS OF THE INVENTION

Figure 1:
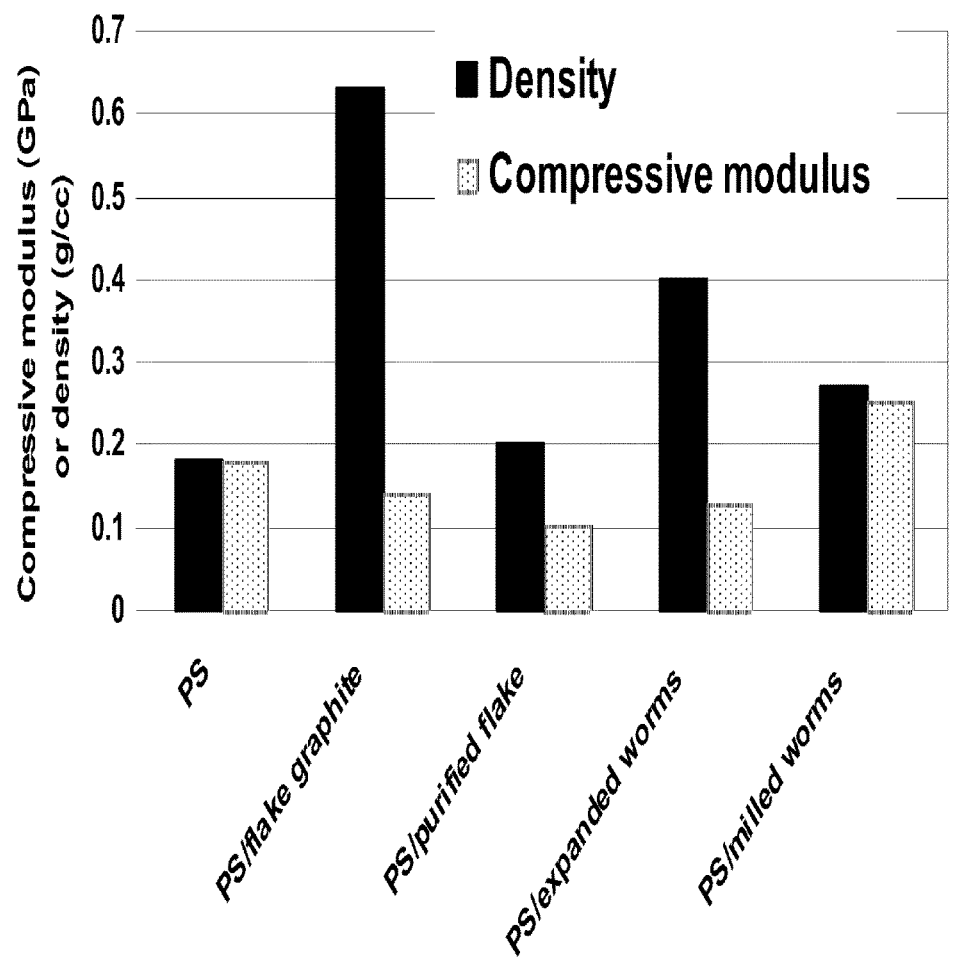
FIG. 1 is a graphical illustration depicting the density and compressive modulus of polystyrene foam and polystyrene foams containing nano-graphite.

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are described herein. All references cited herein, including published or corresponding U.S. or foreign patent applications, issued U.S. or foreign patents, or any other references, are each incorporated by reference in their entireties, including all data, tables, figures, and text presented in the cited references. In the drawings, the thickness of the lines, layers, and regions may be exaggerated for clarity.

The above objects have been achieved through the development of polymer foam products which contains nano-graphite to control cell morphology and act as a gas diffusion barrier. The foam products exhibit improved thermal insulation (R-values), the nano-graphite acting as an infrared attenuating agent and a cell nucleating agent. The nano-graphite in the foam also serves as an internal lubricant during processing of the foam and permits the release of surface static during processing of the foam. Foams containing nano-graphite, of the present invention, also have increased dimensional stability.

The present invention particularly relates to the production of a rigid, closed cell, polymer foam board prepared by extruding process with nano-graphite, at least one blowing agent and, optionally, other additives.

The rigid foamed plastic materials may be made of any such materials suitable to make polymer foams, which include polystyrenes, polyolefins, polyvinylchloride, polycarbonates, polyetherimides, polyamides, polyesters, polyvinylidene chloride, polymethylmethacrylate, polyurethanes, polyurea, phenol-formaldehyde, polyisocyanurates, phenolics, copolymers and terpolymers of the foregoing, including for example, styrene-acrylonitrile (SAN) and acrylonitrile-butadiene-styrene (ABS), thermoplastic polymer blends, rubber modified polymers, and the like. Suitable polyolefins include polyethylene and polypropylene, and ethylene copolymers.

A preferred thermoplastic polymer comprises an alkenyl aromatic polymer material. Suitable alkenyl aromatic polymer materials include alkenyl aromatic homopolymers and copolymers of alkenyl aromatic compounds and copolymerizable ethylenically unsaturated comonomers. The alkenyl aromatic polymer material may further include minor proportions of non-alkenyl aromatic polymers. The alkenyl aromatic polymer material may be comprised solely of one or more alkenyl aromatic homopolymers, one or more alkenyl aromatic copolymers, a blend of one or more of each of alkenyl aromatic homopolymers and copolymers, or blends of any of the foregoing with a non-alkenyl aromatic polymer. Suitable polymers generally have weight-average molecular weights from about 30,000 to about 500,000.

Suitable alkenyl aromatic polymers include those derived from alkenyl aromatic compounds such as styrene, alpha-methylstyrene, ethylstyrene, vinyl benzene, vinyl toluene, chlorostyrene, and bromostyrene. Minor amounts of monoethylenically unsaturated compounds such as $C_{2\_6}$ alkyl acids and esters, ionomeric derivatives, and $C_{4\_6}$ dienes may be copolymerized with alkenyl aromatic compounds. Examples of copolymerizable compounds include acrylic acid, methacrylic acid, ethacrylic acid, maleic acid, itaconic acid, acrylonitrile, maleic anhydride, methyl acrylate, ethyl acrylate, isobutyl acrylate, n-butyl acrylate, methyl methacrylate, vinyl acetate and butadiene. In one or more exemplary embodiments, the alkenyl aromatic polymer is substantially polystyrene (i.e., at least 80%, even 95% polystyrene), and may be composed completely of polystyrene.

The nano-graphite used in this invention has at least one dimension, most likely the thickness of the particle, less than about 100 nanometers, which may be measured by X-ray diffraction. Other dimensions of particles may be less than about 100 microns, less than about 50 microns, or less than about 20 microns. The foam may comprise nanosheets of exfoliated graphite dispersed in the polymeric matrix. Exfoliated graphite is graphite that has been intercalated, preferably by an oxidation process, where the atoms or molecules have been inserted into the inter-planar spacing between the layered planes of carbons, and expanded. The intercalated graphite is expanded or exfoliated preferably by brief exposure to high heat to expand the thickness of the graphite. The expanded or exfoliated graphite is then mixed with monomers and polymerized in situ to form a polymer with a network of nanosheets of the exfoliated graphite dispersed therein.

The exfoliated graphite advantageously retains its nanostructure during the polymerization process. The expanded or exfoliated graphite is compressed together into flexible thin sheets. The nano-graphite in the foam comprises a plurality of nanosheets typically in layers, where each layer may comprise few or even a single carbon layer. The nanosheets have a thickness of between about 10 to several hundred nanometers, with majority in the range from about 10 to about 100 nanometers. Detailed explanation of graphite exfoliation may be found in *Graphite Intercalation Compounds I: Structure and Dynamics*, H. Zabel; S. A. Solin (1990) and *Carbon and Graphite Handbook*, C. L. Mantell (1968), which are herein incorporated by reference.

Nano-graphite is added in an amount from preferably greater than 0% to about 10% by weight, e.g. from about 0.01% to about 10% by weight or about 0.05% to about 5% by weight, with exemplary preferred ranges from about 0.5% to about 5% by weight or from about 0.5% to about 3% by weight or from about 0.05% to about 2.5% by weight.

In mixing the graphite with the polystyrene monomer, as discussed above, it is important to have uniform distribution of the graphite. As such, the surface of the acid treated graphite, as mentioned above, may be functionalized with glycidyl methacrylate ("GMA").

The multi-layered nano-graphite may also be melted and blended with polymer carriers, such as polystyrene, polymethyl methacrylate ("PMMA") and ethyl methacrylate ("EMA"). The loading can be as high as 40%. Mixing temperature is about 150 to about 300° C., typically about 225° C. for EMA, and mixing time about 0 to about 3 minutes, typically less than one minute for EMA carrier containing 40 percent by weight nano-graphite, are crucial for effective dispersing of nano-graphite throughout the polymer. Mixing may be conducted by any standard method know in the art. In an embodiment, the components are mixed using a Banbury mixer.

Blowing agents and other optional additive agents are described below in connection with the process and/or in examples. Further properties of the foam products are also described below.

In another aspect, the present invention relates to a process for preparing a foam product involving the steps of forming a foamable mixture of (1) polymers having weight—average molecular weights from about 30,000 to about 500,000, (2) nano-graphite, as previously described, (3) at least one blowing agent, and, optionally, (4) other process additives, such as a nucleation agent, flame retardant chemicals, foaming the mixture in a region of atmosphere or reduced pressure to form the foam product. In one embodiment, the polymer is polystyrene having weight-average molecular weight of about 250,000.

Standard extrusion processes and methods which may be used in the process of manufacturing the invention are described in commonly owned U.S. Pat. No. 5,753,161, which is herein incorporated by reference in its entirety. Detailed descriptions of foaming methods, including expansion and extrusion can be found in *Plastics Processing Data Handbook* (2nd Edition), Rosato, Dominick©1997 Springer-Verlag which is herein incorporated by reference.

In the extrusion process, an extruded polystyrene polymer, nano-graphite foam is prepared by twin-screw extruders (low shear) with flat die and plate shaper. Alternatively, a single screw tandem extruder (high shear) with radial die and slinky shaper can be used. Nano-graphite is then added into the extruder in an amount from preferably greater than 0% to about 10% by weight, e.g. from about 0.01% to about 10% by weight or about 0.05% to about 5% by weight or more preferably from about 0.5% to about 5% or from about 0.5% to about 3% or from about 0.05% to about 2.5% by weight, based on the weight of the polymer along with the polymer(s) (e.g., polystyrene), a blowing agent, and optionally, other additives such as those described below. In exemplary embodiments, an extruded polystyrene polymer foam is prepared by twin-screw extruders (low shear) with flat die and plate shaper. The nano-graphite compound may be added into the extruder via multi-feeders, along with polystyrene, a blowing agent, and/or other additives.

The plasticized resin mixture containing nano-graphite, polymer, and other optional additives is heated to the melt mixing temperature and thoroughly mixed. The melt mixing temperature must be sufficient to plasticize or melt the polymer. Therefore, the melt mixing temperature is at or above the glass transition temperature or melting point of the polymer. Generally, the melt mix temperature is from about 200 to about 250° C., most preferably about 220 to about 240° C. depending on the amount of nano-graphite.

Figure 2:
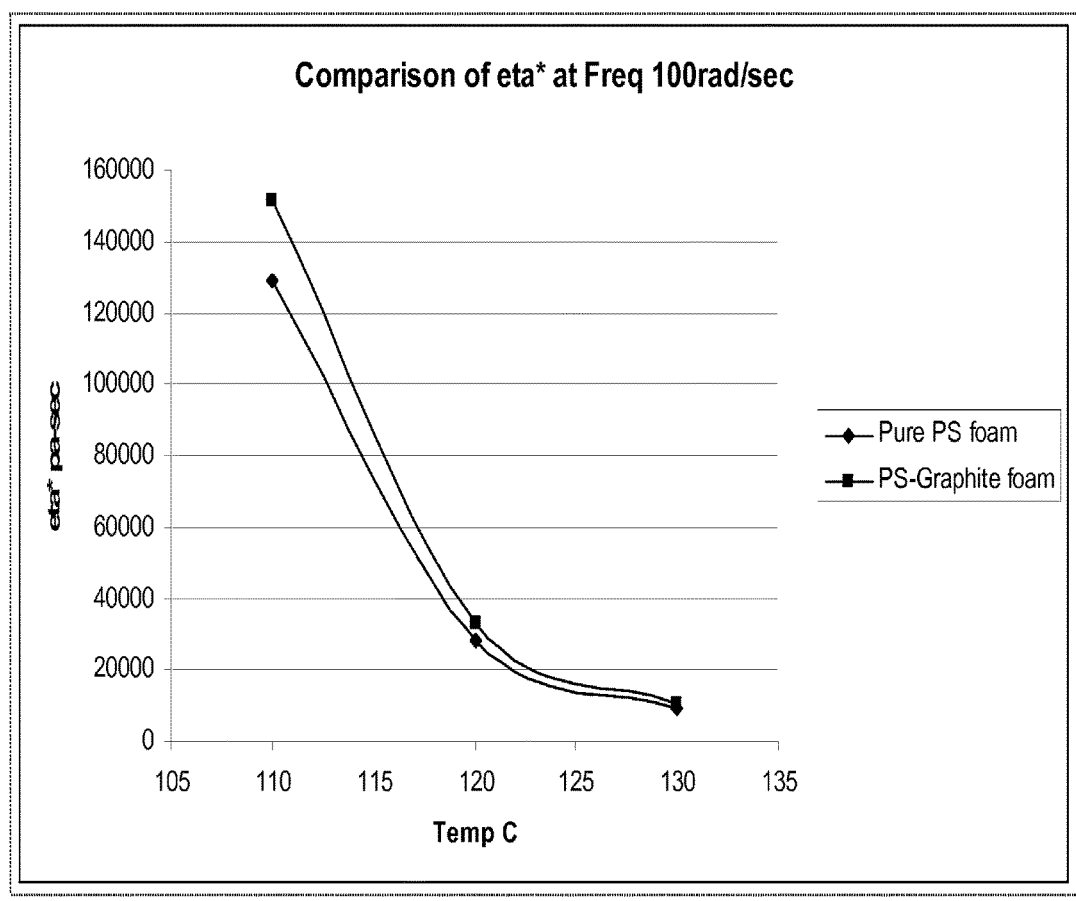
FIG. 2 is a graphical illustration comparing the rheology of pure polystyrene foam and polystyrene foam containing nano-graphite.

Next, a blowing agent (described further below) is incorporated to form a foamable gel. The foamable gel is then cooled to a die melt temperature. The die melt temperature is typically cooler than the melt mix temperature, and in exemplary embodiments, is from about 100° C. to about 130° C., and preferably about 120° C. The die pressure should be sufficient to prevent prefoaming of the foamable gel, which contains the blowing agent. Prefoaming involves the undesirable premature foaming of the foamable gel before extrusion into a region of reduced pressure. Accordingly, the die pressure varies depending upon the identity and amount of blowing agent in the foamable gel. In exemplary embodiments, the pressure is from about 50 to about 80 bars, most preferably about 60 bars. The expansion ratio, foam thickness per die gap, is in the range of about 20 to about 70, typically about 60. FIG. 2 illustrates a comparison of viscosity (eta* in Pa-sec) between grade 1600 polystyrene from NOVA Chemical, PA and the same polystyrene with 1 wt % of nano-graphite additive at regular die shear rate range (around 100 rad/sec frequency). In the regular die temperature operation range, from 115 to 125° C., the viscosity of the polystyrene with nano-graphite is higher, but is manageable within the operation temperature window.

Any suitable blowing agent and combinations of blowing agents may be used in the practice on this invention. Blowing agents useful in the practice of this invention may be selected from: 1) organic blowing agents, such as aliphatic hydrocarbons having 1-9 carbon atoms (including, for example, methane, ethane, propane, n-butane, isobutane, isopentane, n-pentane, isopentane, neopentane and cyclopentane) and fully or partially halogenated aliphatic hydrocarbons having 1-4 carbon atoms (see below) and aliphatic alcohols, ketones, esters and ethers having 1-3 carbon atoms (e.g. methanol, ethanol, n-propanol, and isopropanol; and acetone, methylformate, and dimethylether); 2) inorganic blowing agents, such as carbon dioxide, nitrogen, water, air, argon, nitrogen, and helium; and 3) chemical blowing agents, such as azodicarbonamide, azodiisobutyro-nitrile, benzenesulfonhydrazide, 4,4-oxybenzene sulfonyl-semicarbazide, p-toluenesulfonyl, p-toluene sulfonyl semi-carbazide, barium azodicarboxylate, and N,N'-dimethyl-N,N'-dinitrosoterephthalamide and trihydrazino triazine.

Exemplary halogenated aliphatic hydrocarbon blowing agents include fluorocarbons, chlorocarbons and chlorofluorocarbons. Examples of partially or fully halogenated fluorocarbons include methyl fluoride, difluoromethane (HFC-32), perfluoromethane, ethyl fluoride (HFC-161), 1,2-difluoroethane (HFC-142), 1,1-difluoroethane (HFC-152a), 1,1,1-trifluoroethane (HFC-143a), 1,1,1,2-tetrafluoro-ethane (HFC-134a), 1,1,2,2-tetrafluoroethane (HFC-134), pentafluoroethane (HFC-125), perfluoroethane, 2,2-difluoropropane (HFC-272fb), 1,1,1-trifluoropropane (HFC-263fb), 1,1,1,3,3-pentafluoropropane (HFC 245fa), 1,1,1,2,3,3,3-heptafluoropropane (HFC-227ea), perfluoropropane, 1,1,1,3,3-pentafluorobutane (HFC-365mfc), perfluorobutane, and perfluorocyclobutane. Examples of partially halogenated chlorocarbons and mixed, chlorofluorocarbons for use in this invention include methyl chloride, methylene chloride, chlorodifluoromethane (HCFC-22), ethyl chloride, 1,1,1-trichloroethane, 1,1,1-trifluoroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124), pentafluoroethane, dichloropropane, and the like. Examples of fully halogenated chlorofluorocarbons include trictloromonofluoromethane (CFC-11), dichlorodifluoromethane (CFC-12), trichlorotrifluoroethane (CFC-113), dichlorotetrafluoroethane (CFC-114), chloroheptafluoropropane, and dichlorohexafluoropropane.

Particularly useful blowing agents include 1-chloro-1,1-difluoroethane (HCFC-142b), 1,1,1,2-tetrafluoro-ethane (HFC-134a), carbon dioxide, and 1,1-difluoroethane (HFC-152a); and blends of these: e.g. HCFC-142b with carbon dioxide, HFC-134a with carbon dioxide, carbon dioxide with ethanol, carbon dioxide with water, and HFC-134a with HFC-152a. About 50% of the HFC-134a blowing agent and about 50% of the HFC-152a blowing agent may be present in the composition. Both components are based on the weight of the polymer. However, for low density, thick products, the amount of HFC-152a may be increased up to about 60% or more based on the weight of the polymer.

In the present invention, it is preferable to use about 6 to about 14%, preferably about 11%, by weight based on the weight of the polymer of the blowing agent (e.g. cyclopentane). If used, it is also preferred to add about 0 to about 4% ethanol and/or about 3 to about 6%, preferably about 3.5% carbon dioxide. All percentages are based on the weight of the polymer.

Optional additives may be incorporated in the extruded foam product and may include, but are not limited to, additional infrared attenuating agents, cell size enlarging agents, plasticizers, flame retardant chemicals, pigments, elastomers, extrusion aids, antioxidants, fillers, antistatic agents, UV absorbers, citric acids, nucleating agents, surfactants, processing aids, and mold release aids. These optional additives may be included in any amount to obtain desired characteristics of the foamable gel or resultant extruded foam products and/or to improve the processing of the foam or modify one or more properties of the resulting foam. Preferably, optional additives are added to the resin mixture but may be added in alternative ways to the extruded foam manufacture process.

Although the polymer foams manufactured according to the present invention may have structures exhibiting both closed cells and open cells, preferred foam compositions will have at least 90 percent closed cells as measured according to ASTM D2856-A. Exemplary embodiments of polymer foam products manufactured according to the present invention can exhibit densities of from about 10 to about 500 kg/m$^3$, but will more preferably have densities of from about 20 to about 60 kg/m$^3$ when measured according to ASTM D1622. For a preferred rigid, foam insulation board as described herein, the density is generally about 20-80 kg/m$^3$ (about 1.2-5 pcf), typically about 22-48 kg/m$^3$ (about 1.4 to about 3 pcf); and is about ⅛ to about 12 inches thick, typically about 1 to about 4 inches thick. The resulting board exhibits an R-value (per inch) of from about 3 to about 8.

As mentioned above, the nano-graphite in the foam controls cell morphology. The nano-scale graphite acts as a nucleating agent in the foaming process. The cell morphology includes parameters such as cell mean size, cell anisotropic ratio or cell orientation, cell density, cell size distribution, cell wall thickness, cell strut effective diameter, open/closed cell ratio, cell shape, such as pentagonal dodecahedral, rhombic dodecahedron, tetra dodecahedral (with curved surface), and other models of cells such as bi-cell and cell-in-cell models. Within these cell morphology parameters, cell mean size, cell wall thickness, cell strut effective diameter, and cell orientation are key parameters for determining the foam physical properties of closed cell foams.

The invention uses nano-particles such as nano-graphite and the above-described extrusion process to control the cell size, cell wall thickness, strut effective diameter, and cell orientation of the foam products within a relatively broad range. As discussed above, the particle size of the present nano-particle cell size controlling agent (e.g. nano-graphite) is typically no greater than 100 nanometers in at least one dimension, typically the thickness dimension. Additionally, the nano-particle may be an organic or inorganic material either with or without surface modification. Conventional polymer foams tend to exhibit a cell mean size in the range between about 120 and 280 microns. By utilizing the nano-particle technology according to the present invention, it is possible to manufacture polymer foam structures having a cell mean size from several tens of microns to several hundred microns.

Figure 3:
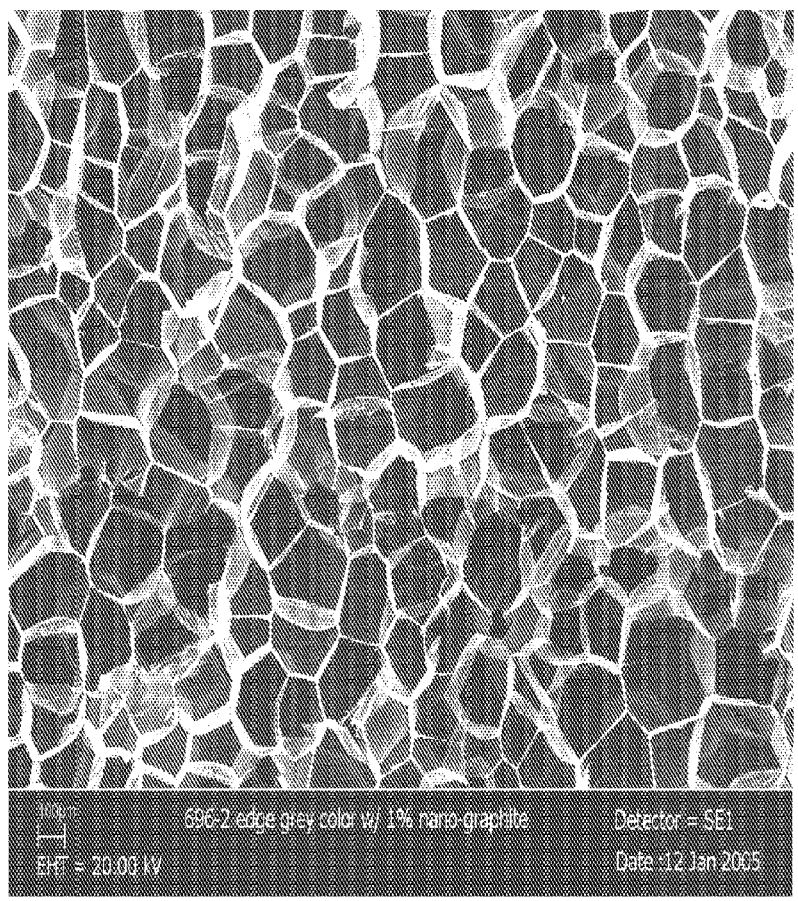
FIG. 3 is a scanning electronic microscope (SEM) image of the foam cells of the present invention.
Figure 4:
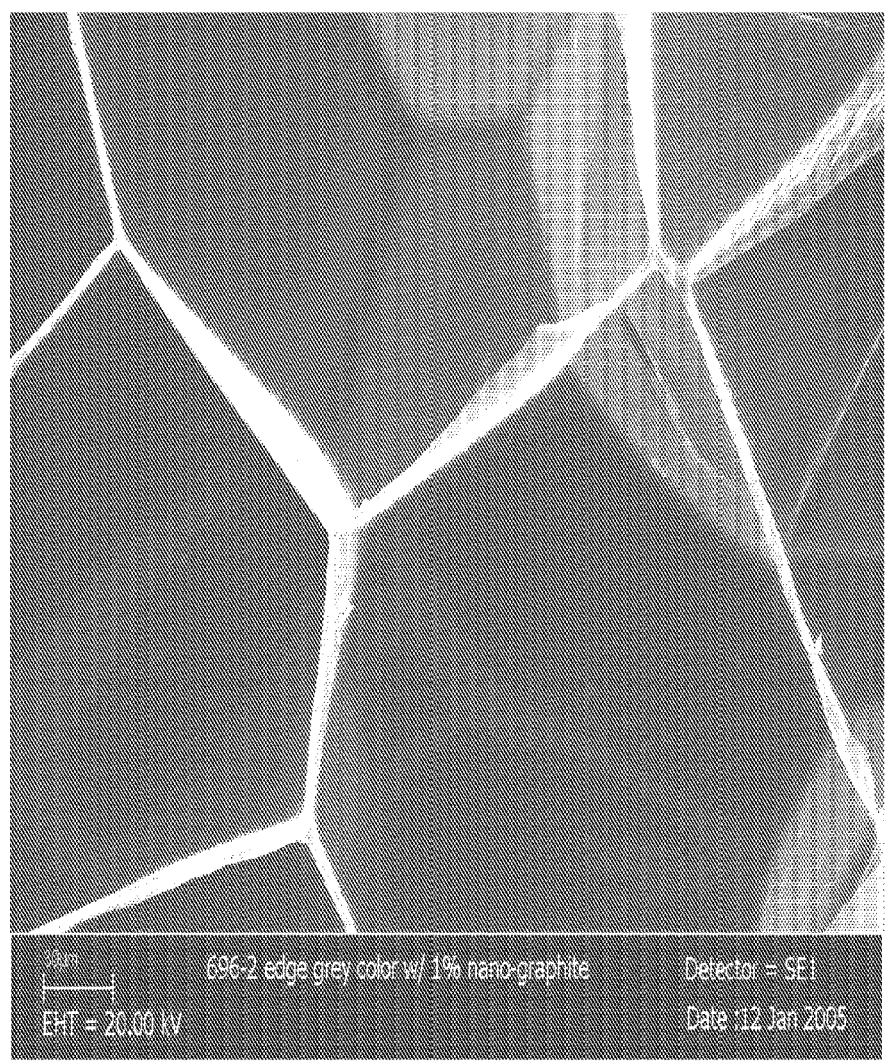
FIG. 4 is a scanning electronic microscope (SEM) image of the foam cell walls and struts.

FIG. 3 is a scanning electron microscope (SEM) image of the foam including 1% nano-graphite in polystyrene foam. The average cell size of the foam without any other nucleating agent such as talc is around 220 microns; orientation in the x/z direction=1.26 (x 0.254, y 0.205, z 0.201 mm). FIG. 4 is an SEM image of the cell walls and struts of the foam product. The polystyrene foam contains 1% nano-graphite. The thickness of the cell walls is about 0.86 microns, the strut diameter is about 3.7 microns.

Figure 5:
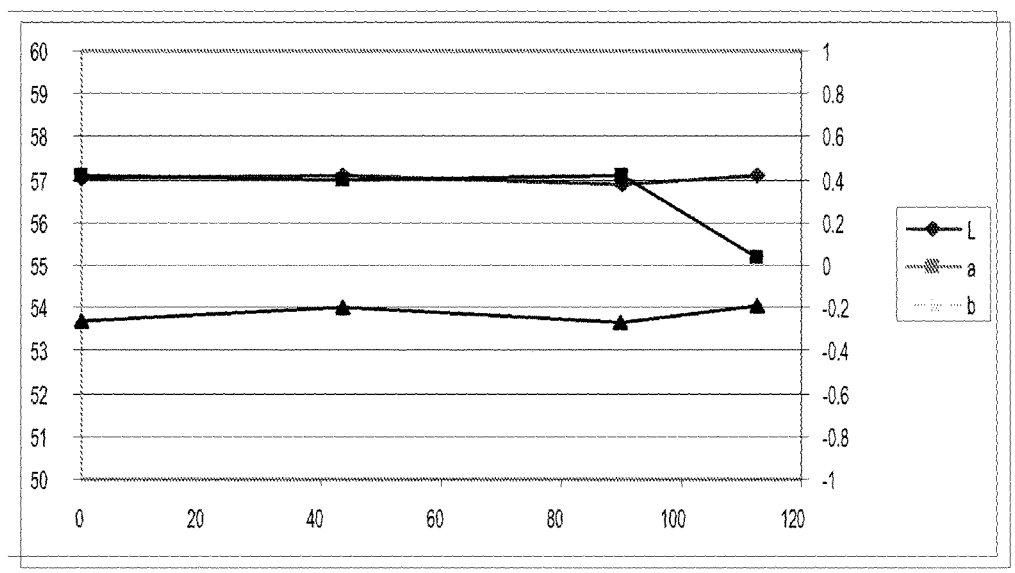
FIG. 5 is a graphical illustration comparing a polystyrene foam board to the nano-graphite/polystyrene board of the present invention when both boards are exposed to UV radiation.

FIG. 5 illustrates the UV protectability of a polystyrene foam board including the nano-graphite of the present invention when the board is exposed to UV radiation. The test method used is a QUV test, followed by color measurement. Test methods and material standards for the QUV test include ISO 4982-1 Plastics, ASTM G-151, ASTM G-154, ASTM G53, British Standard BS 2782, Part 5, Method 540B, and SAE J2020, JIS D0205. All test methods and standards cited above are herein incorporated by reference in their entireties. The color measurements are made on the L*a*b scales. The L scale, from 0 to 100, represents a black to white relationship. The nano-graphite foam with grey color was almost no change from an extended UV exposure for more than 100 days. The a and b scale, from 1 to −1, represent the different color changes: from red to green, and from yellow to blue. Slight changing of color has been observed after more than 90 days UV exposure for the nano-graphite foam board.

Having generally described this invention, a further understanding can be obtained by reference to certain specific examples illustrated below which are provided for purposes of illustration only and are not intended to be all inclusive or limiting unless otherwise specified.

EXAMPLES

Figure 6:
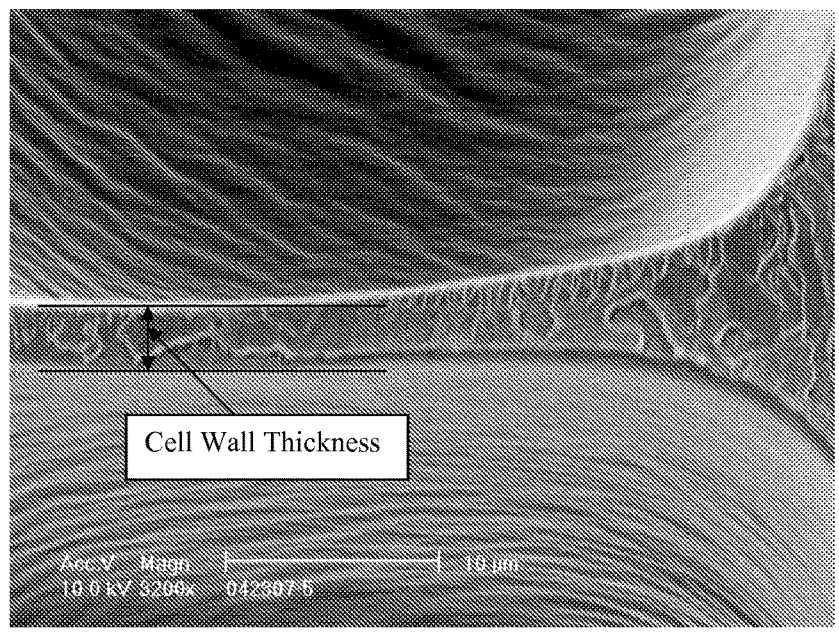
FIG. 6 is a scanning electron microscope (SEM) image of the cell wall structure of a typical extruded polystyrene (XPS) foam.
Figure 7:
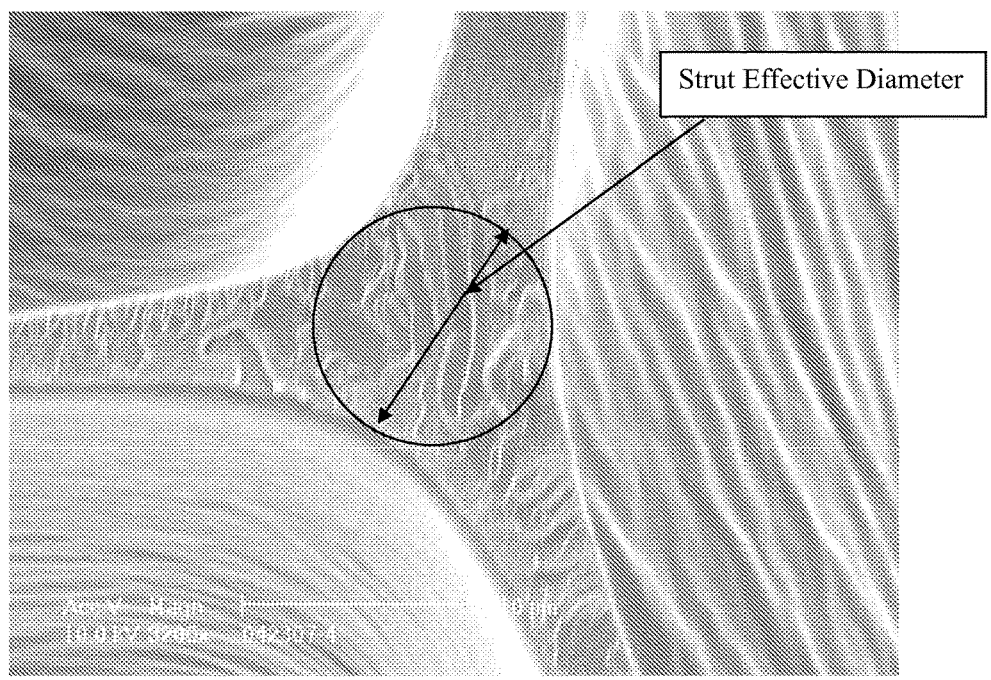
FIG. 7 is an SEM image of the cell strut structure of a typical extruded polystyrene (XPS) foam.

A series of exemplary and comparative foam structures were prepared and evaluated to determine cell morphology, i.e., cell size, cell wall thickness (FIG. 6), effective diameter of cell strut (FIG. 7), cell anisotropy ratio, and certain other properties related to the foam cell morphology. In particular, FIGS. 6 and 7 show the SEM imagines of the cell wall and strut structure of a typical extruded polystyrene (XPS) foam. If a polymer foam is ideally depicted as a close wall of pentagonal dodecahedral cells in a uniform size, the cell wall thickness and the strut effective diameter then depend primarily on the density of the foam and the cell size.

The physical properties tested included one or more of density, compressive strength, thermal conductivity, aged thermal insulation value, thermal dimensional stability. In connection with these examples, cell size was measured according to ASTM D3576; density was measured according to ASTM D1622; thermal conductivity was measured according to ASTM C518; compressive strength was measured according to ASTM D1621; and thermal dimensional stability was measured according to ASTM D2126.

The foam structures were made with a twin co-rotated screw extruder comprising a pair of extruder screw, a heating zone mixer, a blowing agent injector, a cooler, a die and a shaper in accord with the operational conditions listed below in Table 1. The conditions set forth in Table 1 are applicable to Examples 1-6. Unless otherwise indicated, the polymer utilized in preparing the example foam compositions was an A to F in a granular polystyrene having a weight average molecular weight ($M_w$) of about 250,000, and melt index of about 3.1 gm per 10 minutes.

TABLE 1

|  | LMP Co-rotating Twin Screw Extruder with Static Cooler | Leistritz MIC 27 GL/400 Co-rotating Twin Screw Extruder |
|---|---|---|
| Die/Shaper | Flat face die/ Shaper plate | 20 × 2 mm Flat Slot Die |
| Forming Atmosphere | Atmosphere/ Vacuum | Atmosphere |
| Throughput - kg/hr. | 100-200 | 6-10 |
| Wt. % of HCFC-142b | 10.5-11.5 |  |
| Wt. % of HCFC-142b/22 |  |  |
| Wt. % of $CO_2$ |  |  |
| Mixing Temperature - ° C. | 210-230 | 200-220 |
| Extruder Pressure - kPa (psi) | 13000-17000 (1950-2400) | 6900-8300 (1000-1200) |
| Die Melt Temperature - ° C. | 117-123 | 130-160 |
| Die Pressure - kPa (psi) | 5400-6600 (790-950) | 5500-8000 (800-1150) |
| Line Speed - m/hr (ft/min) | 108-168 (5.9-9.2) | 90-80 (5-10) |
| Die Gap - mm | 0.6-0.8 | 2 |
| Vacuum - kPa (inch Hg) | 0-3.4 (0 to 16) | Atmosphere |

Example 1

Polystyrene foams were prepared both with (7347) and without (7346) a 2.5% nano-particle loading using an LMP extruder. The nano-particle used to prepare this Example was an organoclay, specifically grade Nano-MMT 20A from Southern Clay Products Inc., that was melt compounded with a polystyrene polymer, specifically grade CX5197 from A to F in a, to form a melt polymer. The nano-particles exhibited an intercalated nano-MMT layer structure when examined using X-ray diffraction. The comparison sample did not include any nano-particles, but incorporated 0.8% talc loading as the nucleating agent. The comparison sample exhibited an average cell size of around 186 microns while the exemplary example utilizing the nano-particle foam exhibited a significantly reduced average cell size of around 60 microns. The exemplary example also exhibited a cell wall thickness of around 0.5 micron, and a strut effective diameter of around 5 microns. As reflected below in Table 2, the exemplary foam composition did not exhibit corrugation, was processed without undue process difficulty and provided improvements in compressive strength of around 30%.

TABLE 2

| Sample | Nano-Particle Wt. % | Average Cell micron | Cell Anisotropic Ratio* | Density kg/m³ | Strength kPa | Thickness mm |
|---|---|---|---|---|---|---|
| 7346 | 0 | 186 | 0.949 | 29.28 | 286 | 37 |
| 7347 | 2.5 | 62 | 0.968 | 32 | 372 | 26 |

*Cell anisotropic ratio: K = z/(x.y.z) where x, an average cell size in the longitudinal (extruding) direction, y, cell size in the transverse direction, and z, cell size in the board thickness direction Example 2

Figure 8:
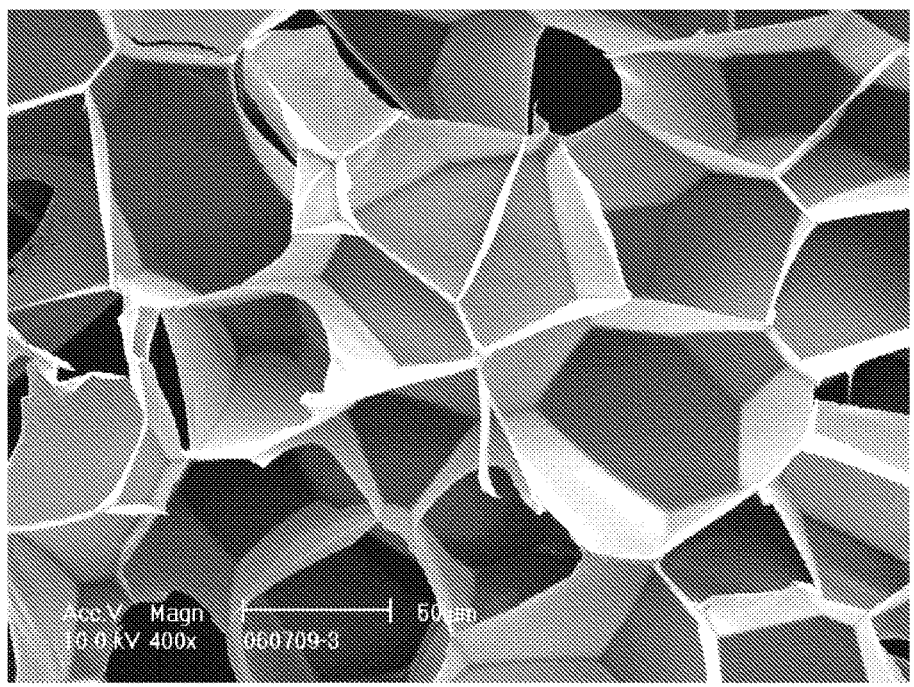
FIG. 8 is an SEM image of an XPS foam with average cell size of about 81 microns produced with about 0.5% of a nano-clay nucleating agent.

Sample foams (7349) were produced according to the process outlined in Example 1, but using 0.5% of an intercalated nano-MMT in a polystyrene composition to produce an exemplary foam having a density of about 26.5 kg/m³, a thickness of about 38 mm and a width of about 600 mm. The reduction in the amount of nano-MMT incorporated into the composition resulted in a slightly increased cell size, about 83 microns (FIG. 8), compared with Example 1, while maintaining improved strength, 329 kPa, over the comparative foam compositions.

Example 3

Figure 9:
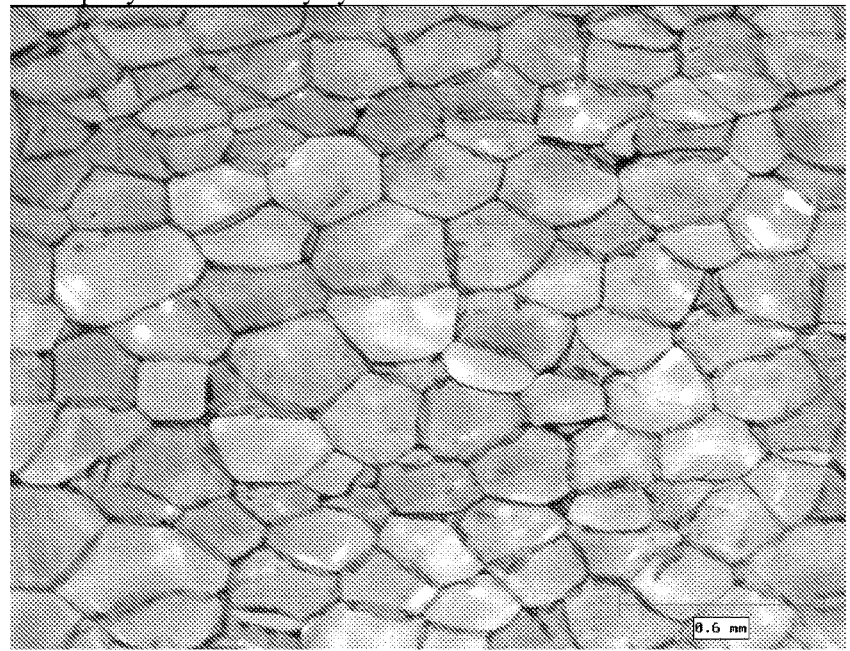
FIG. 9 is an optical microscope image of the cell size, cell size distribution, and cell orientation (x/z) of an XPS foam with 2% nano-calcium carbonate.

Foams (7790) were prepared using a nano-particle loading of 2% nano-calcium carbonate from Ampacet, along with 1% talc as an additional nucleating agent and 1% of stabilized hexabromocyclododecone as fire retardant agent in a LMP extruder. The nano-calcium carbonate particles were typically elongated, having average dimensions of 80 nm×2 gm, and were provided in a 50% master batch composition in combination with an olefinic copolymer carrier resin. The rest of formulation was polystyrene: 80% Nova 1220 (Melt Index=1.45) and 16% Nova 3900 (Melt Index=34.5). The exemplary foam produced was 28 mm thick, 400 mm wide and had an average cell size of 230 microns with a cell orientation—the ratio of the cell dimension in the extrusion direction to the cell dimension in the thickness direction (x/z)—as high as 1.54 (see FIG. 9).

Example 4

Figure 10:
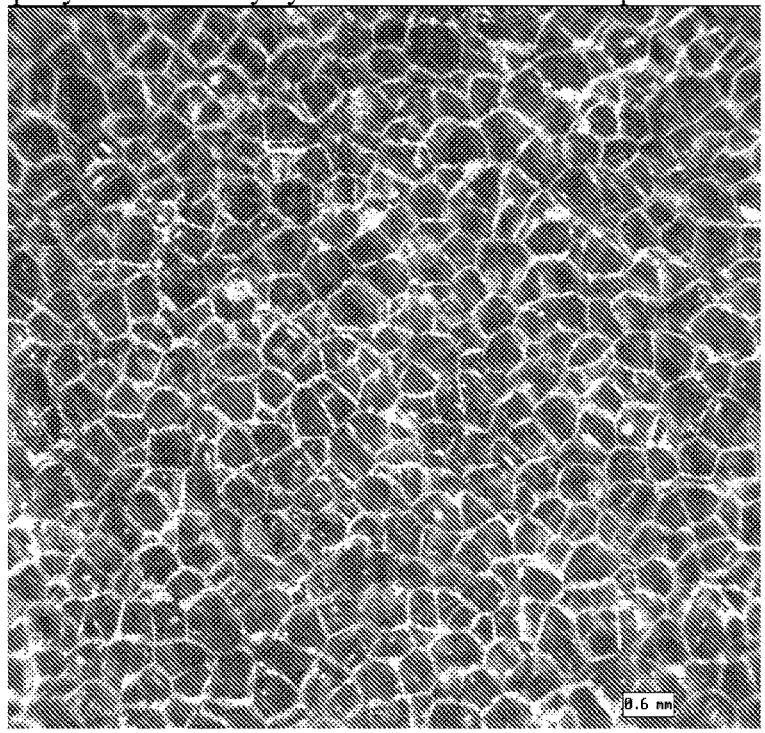
FIG. 10 is an optical microscope image of the cell size, cell size distribution, and cell orientation (x/z) of an XPS foam with 3.3% of a nano-expanded graphite nucleating agent.

Foams (7789) were produced as in Example 3, but used 3.3% intercalated expanded nano-graphite from Superior Graphite Company as the nano-particles. The expanded nano-graphite included nano-sheets of graphite having thicknesses ranging from about 10 to about 100 nm and widths of around 3 gm. The exemplary foam exhibited substantially the same thickness, width, and density (49 kg/m³) as Example 3, but had a smaller average cell size of 166 microns and cell orientation value of 1.21 (see FIG. 10). The thermal conductivity of this foam is as low as 0.14 K·m²/W for samples after being aged for 20 days.

Example 5

Foams (7289, 7291) were prepared using a Leistritz extruder to produce samples having a thickness of around 10 mm, a width of around 50 mm, and a density of around 46 kg/m³. Both samples with 0.5% of talc as nucleating agent, and 10% of HCFC1421)/22 as blowing agent. Some characters of cell morphology are summarized as Table 3.

TABLE 3

| Sample | Nano-Particle* Wt. % | Average Cell micron | Cell Orientation x/z | Cell Size x | Cell Size y | Cell Size z | Cell Wall Thickness micron | Strut Effective Diameter micron |
|---|---|---|---|---|---|---|---|---|
| 7289 | 0 | 341 | 0.99 | 355 | 359 | 339 | 1.8 | 4.2 |
| 7291 | 5 | 174 | 0.95 | 165 | 183 | 173 | 0.8 | 5.1 |

Example 6

Figure 11:
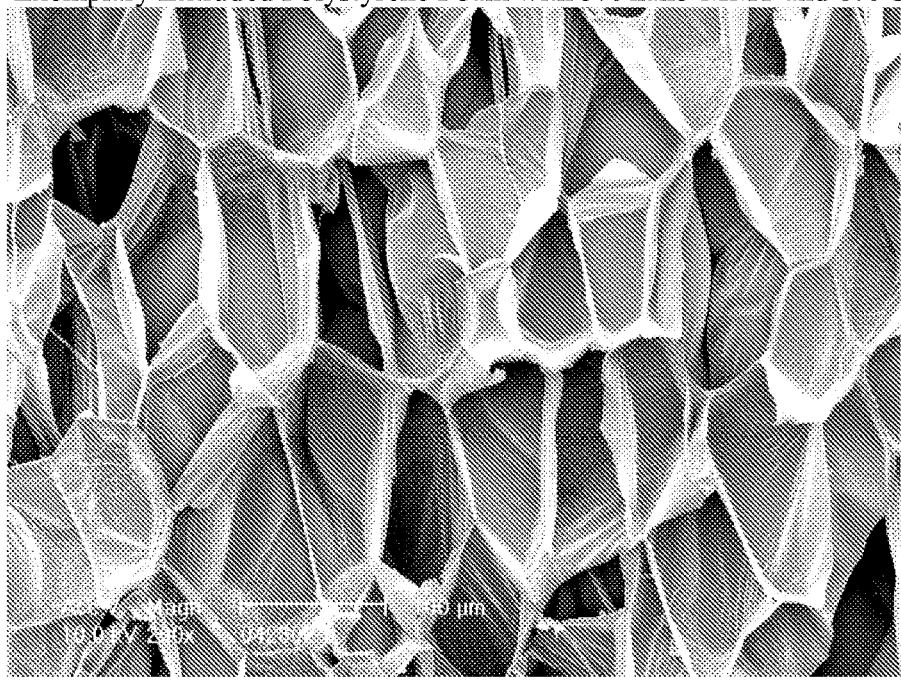
FIG. 11 is an SEM cell morphology image of an XPS foam sample prepared using 5% nano-MMT as a nucleating agent and 6% $CO_2$ as a blowing agent.

Foams (7293, 7294) were prepared as in Example 5, but using 6 wt % of carbon dioxide as the blowing agent and 0.2 wt % of talc as a conventional nucleating agent. Some characteristics of the resulting cell morphologies (FIG. 11) are summarized below in Table 4.

TABLE 4

| Sample | Nano-Particle* Wt. % | Average Cell micron | Cell Orientation x/z | Cell Size Diameter x | Cell Size Diameter y | Cell Size Diameter z | Cell Wall Thickness micron | Strut Effective micron |
|---|---|---|---|---|---|---|---|---|
| 7293 | 0 | 380 | 0.92 | 355 | 396 | 388 | 1.4 | 3 |
| 7294 | 5 | 146 | 0.76 | 146 | 121 | 158 | 0.3 | 5.4 |

Example 7

In the following samples and control samples, rigid polystyrene foam boards are prepared by a twin screw LMP extruder with flat die and shaper plate; and a two single screw tandem extruder with radial die and slinky shaper. A vacuum may also be applied in both of the above described pilot and manufacturing lines.

Table 5 shows the process conditions for samples in a twin screw extruder for making foam boards having a width of 16 inches and a thickness of one inch.

TABLE 5

|  | Samples on Table 8 |
|---|---|
| Wt. % of nano-graphite | 1 to 5 |
| Wt. % of talc | 0.5-1.5 |
| Wt. % of nano-carbon black | 0 to 6 |
| Wt. % of mica | 0 to 4 |
| Wt. % of HCFC-142b | 11 |
| Wt. % of CO2 | 0 |
| Extruder Pressure, Kpa (psi) | 13000-17000 (1950-2400) |
| Die Melt Temperature, (° C.) | 117-123 |
| Die Pressure, Kpa (psi) | 5400-6600 (790-950) |
| Line Speed, m/hr (ft/min) | 110-170 (6-9.5) |
| Throughput, kg/hr | 100 |
| Die Gap, mm | 0.6-0.8 |
| Vacuum - KPa (inch Hg) | 0-3.4 (0 to 16) |

The thickness of nano-graphite used was confirmed by X-ray diffraction to be 29.7 nm, and 51 nm after compounding with about 60 wt % of polystyrene. Carbon black was not part of mix with nano-graphite due to its poor process ability and high smoke density during fire test.

The results of above examples are shown in Table 6. All R-values and compressive strength are tested after the samples aged for 180 days

TABLE 6

| Run # | Aged R-value K·m2/K (F·ft2·hr/Btu) | Density Kg/m3 (pcf) | Compressive Strength psi | Nano-graphite Wt % |
|---|---|---|---|---|
| Control sample | 0.029 (5.05) | 27.68 (1.73) | NA | 0 |

TABLE 6-continued

| Run # | Aged R-value K·m2/K (F·ft2·hr/Btu) | Density Kg/m3 (pcf) | Compressive Strength psi | Nano-graphite Wt % |
|---|---|---|---|---|
| 696-2 X8234 | 0.025 (5.82) | 28.64 (1.79) | 21.55 | 1 |
| 696-4 X8235 | 0.024 (6.03) | 30.72 (1.92) | 22.67 | 3 |
| 692-2 X8207 | 0.025 (5.77) | 27.84 (1.74) | 25.69 | 1 |
| 692-3 X8208 | 0.024 (5.94) | 28.8 (1.80) | 27.27 | 2 |
| 692-4 X8209 | 0.024 (6.00) | 28.96 (1.81) | 26.87 | 3 |

As shown from above samples, the addition of nano-graphite in foaming processing, preferably about 1% to about 3% by weight of the polymer has profound effect on the thermal resistance property. The range of the R-value was determined to be between about 5.7 and about 6.0 per inch.

Example 8

Table 7 compares the operating conditions between batch foaming and traditional low-density foam extrusion.

TABLE 7

| Comparison of Operating Conditions between Batch and Extrusion Foaming | | |
|---|---|---|
| Operating conditions | Extrusion | Batch Foaming |
| Temperature (° C.) | 100-140 | 120 |
| Pressure (psi) | 1000-2000 | 2000 |
| dP/dt (Pa/sec) | $10^6$ | $10^6$ |

Prior to batch foaming, the polymerized nano-graphite/polystyrene compound is heated and compressed into a solid shape. The solid sheet is cut into small pieces according to the size of pressure vessel, such as 77×32×1 mm. The solid sheet specimen is then placed in a mold and foamed in a high-pressure vessel at about 80 to about 160° C., typically about 120° C. and about 500 to about 4000 psi, typically about 2000 psi. The solid sheet remains in the pressurized vessel for about 8 to about 50 hours, typically about 12 hours, after which the pressure in the vessel was released quickly (about 12 seconds) for foaming.

The nano-graphite/polystyrene foam of the batch foaming samples were evaluated to determine the amount infrared radiation transmitted through the foam. As infrared light is the major form of thermal radiation.

A piece of batch-foamed sample containing polystyrene and 3% graphite, and two other comparison samples containing polystyrene or polystyrene and 5% nano-clay were selected. On one side of the foam sample a light source of infrared laser was placed. On the other side of the sample, either a detector was placed to record the transmission light intensity or a temperature camera was placed to monitor the surface temperature change. The results are summarized in Table 8.

TABLE 8

Infrared Light Transmission Through foam samples of polystyrene (PS), polystyrene and 5% nano-clay (PS/5% clay), and polystyrene and 3% nano-graphite (PS/3% graphite)

| IR Transmission Intensity (watts) | Emissive Intensity | Received Intensity | % Trans |
|---|---|---|---|
| PS (control sample) | 0.5 | 0.05 | 10% |
| PS/5% MHABS* | 0.5 | 0.02 | 4% |
| PS/3% milled graphite worms | 0.5 | 0.01 | 2% |

*in-situ polymerized compound with 5% of reactive cationic surfactant, 2-methacryloyloxyethylhexadecyldimethyl ammonium bromide (MHAB) treated Na+ montmorillonite with 95% styrene monomer As shown in Table 8, 10% of the light transmits through the pure PS foam sample, while only 4% through the PS/5% clay foam sample and only 2% through the PS/3% graphite sample. Both clay and graphite have the attenuation effect on the infrared light, however, as shown in the above table, PS/3% graphite has considerably better transmission attenuation.

The temperature of the PS/graphite sample, on the side of the sample opposite to the light source, was slightly elevated, having an increase of about 2-3° F. after 60 seconds of exposure (Table 9). There was no obvious change in surface temperature for foam samples of pure PS (control sample) and PS with MHABS nano-clay. As such, PS/graphite foam attenuates thermal radiation and enhances the heat solid conduction. Further, by improved graphite dispersion and concentration, these trends are expected to be more significant.

TABLE 9

Temperature change for foam samples of PS, PS/5% clay, and PS/3% graphite on the surface opposite to the light source

| | IR Camera Temperature at Interval Time in Seconds | | | | | | |
|---|---|---|---|---|---|---|---|
| | 0 | 10 | 20 | 30 | 40 | 50 | 60 |
| PS (control sample) | 78.4° F. | 78.4° F. | 78.7° F. | 78.8° F. | 78.4° F. | 78.5° F. | 78.5° F. |
| PS/5% MHABS | 79.2° F. | 79.2° F. | 79.5° F. | 79.6° F. | 79.4° F. | 79.5° F. | 79.6° F. |
| PS/3% milled graphite | 80.6° F. | 81.2° F. | 81.7° F. | 82° F. | 82.6° F. | 82.8° F. | 83° F. |

The invention of this application has been described above both generically and with regard to specific embodiments. Therefore, it is to be understood that a wide variety of alternatives known to those of skill in the art can be selected within the generic disclosure.

What is claimed is:

1. An extruded polymeric foam material comprising:
   a polymer comprising polystyrene, wherein the polymer has a weight-average molecular weight from 30,000 to 500,000;
   a blowing agent composition comprising carbon dioxide; and
   from 0.05 to 5 wt. % of a nano-graphite material based upon the total weight of the polymer,
   wherein the extruded polymeric foam material comprises cell walls and struts that define a plurality of cells,
   wherein at least 90% of the cells are closed cells, and
   wherein a ratio r of the cell dimension in an extrusion direction to the cell dimension in a thickness direction satisfies one of: $r<1$ and $1<r\leq1.54$.

2. The extruded polymeric foam material of claim 1, wherein the nano-graphite material is selected from the group consisting of nanosheets of graphite, intercalated nano-graphite, exfoliated nano-graphite, and expanded nano-graphite.

3. The extruded polymeric foam material of claim 1, wherein the blowing agent composition further comprises at least one blowing agent selected from the group consisting of aliphatic hydrocarbons having 1-9 carbon atoms, fully or partially halogenated aliphatic hydrocarbons having 1-4 carbon atoms, methane, ethane, propane, n-butane, isobutane, isopentane, n-pentane, isopentane, neopentane, cyclopentane, methanol, ethanol, n-propanol, and isopropanol.

4. The extruded polymeric foam material of claim 3, wherein the blowing agent composition further comprises at least one blowing agent selected from the group consisting of 1,1,1,2-tetrafluoroethane (HFC-134a), 1,1-difluoroethane (HFC-152a), water, and ethanol.

5. The extruded polymeric foam material of claim 1, wherein the nano-graphite has a size, in at least one dimension, of less than 100 nanometers.

6. The extruded polymeric foam material of claim 1, wherein the cells have a median cell size of less than 150 microns.

7. The extruded polymeric foam material of claim 1, wherein the extruded polymeric foam material is a rigid insulating foam board.

8. The extruded polymeric foam material of claim 7, wherein the foam board has a density from 1.2 pcf to 5 pcf.

9. The extruded polymeric foam material of claim 7, wherein the foam board has a thickness from ⅛ inch to 12 inches.

10. The extruded polymeric foam material of claim 1, wherein the extruded polymeric foam material is a foam board having an R-value per inch from 3 to 8.

* * * * *